US009483314B2

(12) United States Patent
Malaiyandisamy et al.

(10) Patent No.: US 9,483,314 B2
(45) Date of Patent: Nov. 1, 2016

(54) SYSTEMS AND METHODS FOR FAULT TOLERANT BATCH PROCESSING IN A VIRTUAL ENVIRONMENT

(71) Applicant: Infosys Limited, Bangalore (IN)

(72) Inventors: Ganesan Malaiyandisamy, Bangalore (IN); Sridhar Murthy, Bangalore (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/493,318

(22) Filed: Sep. 22, 2014

(65) Prior Publication Data
US 2015/0089505 A1  Mar. 26, 2015

(30) Foreign Application Priority Data
Sep. 26, 2013  (IN) ............ 4372/CHE/2013

(51) Int. Cl.
*G06F 9/45* (2006.01)
*G06F 9/50* (2006.01)

(52) U.S. Cl.
CPC ....... *G06F 9/5072* (2013.01); *G06F 2209/503* (2013.01)

(58) Field of Classification Search
None
See application file for complete search history.

(56) References Cited

U.S. PATENT DOCUMENTS 8,667,495 B1 * 3/2014 Brandwine ......... H04L 41/0806
709/223

* cited by examiner

*Primary Examiner* — Chuck Kendall
(74) *Attorney, Agent, or Firm* — Marc S. Kaufman; Amardeep S. Grewal; Reed Smith LLP

(57) ABSTRACT

A system for fault tolerant batch processing in a virtual environment is configured to perform batch job execution, the system includes computing devices configured as a virtualized grid cluster by means of a virtualization platform, the cluster includes a centralized storage repository, a grid manager deployed on an instantiated virtual machine and a message bus whereby data and messages are exchanged between the grid manager and one or more grid nodes. The grid manager is configured to manage one or more incoming job requests, queue one or more of the received job requests in a job execution queue and monitor one or more virtual grid nodes.

21 Claims, 5 Drawing Sheets

SYSTEMS AND METHODS FOR FAULT TOLERANT BATCH PROCESSING IN A VIRTUAL ENVIRONMENT

RELATED APPLICATION DATA

This application claims priority to India Patent Application No. 4372/CHE/2013, filed Sep. 26, 2013, the disclosure of which is hereby incorporated by reference in its entirety.

FIELD OF THE INVENTION

This disclosure relates generally to the field of batch processing and more particularly to the processing of batch jobs in a virtualized environment.

BACKGROUND

Enterprises adopt workflow management tools to automate their business processes and handle complex batch processing. Batch applications are computationally data intensive and if executed during business hours by an enterprise, may impact its critical customer front-end applications due to their high resource cost. In addition, delay or failures in batch-application execution have significant business impact potential due to their high do-over cost in time and compute resources.

To make quick business decisions, real-time inputs to business intelligence applications are critical and these applications have to perform complex operations and generate reports with speed and accuracy. Delays may impact business decisions and produce a rippling effect on business operations. In addition, front-end applications such as e-commerce and financial analysis platforms need to be served a large set of data in real-time as they perform complex and computationally intensive algorithms based on customer requests. Therefore, in a time when enterprises are experiencing pressure to make their business more agile, their business applications need to perform and scale optimally and, preferably, in real-time.

Current batch application processing solutions are based on dedicated clustering technologies for high availability and performance. Although clustering technologies allow computing infrastructure to scale-out on-demand to a certain extent they may be unable to grow beyond their local spatial environment and are generally homogenous computing clusters. However, batch processing applications may require a highly heterogeneous and distributed environment for fast real-time scale out that integrates fault tolerance. Therefore, merely clustered based batch solutions may be unable to meet an enterprise's demands.

SUMMARY

Disclosed are methods, system, and instructions embodied in non-transitory computer readable media for fault tolerant batch processing in a virtual environment.

In one aspect, a disclosed system, in accordance with at least one embodiment, may include a system configured to perform batch job execution in a virtualized environment. The system may comprise one or more computing devices configured as a virtualized grid cluster by means of a virtualization platform, the cluster comprising a centralized storage repository associated with computer memory across one or more of the computing devices, a grid manager deployed on an instantiated virtual machine. The grid manager may be configured to manage one or more incoming job requests, wherein managing comprises deploying a job and workflow management instance for defining and storing an incoming job request at the centralized storage repository, and queue one or more of the received job requests in a job execution queue wherein the position of a job request in the queue is determined by a policy engine associated with the grid manager. The system may additionally be configured to monitor one or more virtual grid nodes, wherein a virtual grid node is provisioned on demand by the virtualization platform, and monitoring comprises collecting computing resource utilization by the virtual grid node and deploying tasks to one or more of the grid nodes; and additionally comprise a message bus whereby data and messages are exchanged between the grid manager and one or more grid nodes.

In one aspect, a method may include receiving, by one or more computing devices comprising a processor and a processor readable memory, an input job request, processing the input job request by a grid manager process running on the one or more computing devices, wherein processing comprises checking for computing resource availability and job priority. The method may additionally include provisioning, by the one or more computing devices, computing resources for completion of the job request by a grid manager process; and monitoring, by a monitoring engine process running on the one or more computing devices, the computing resource usage profile of the job during execution.

BRIEF DESCRIPTION OF THE DRAWINGS

Example embodiments are illustrated by way of example and not limitation in the figures of the accompanying drawings, in which like references indicate similar elements and in which.

Figure 1:
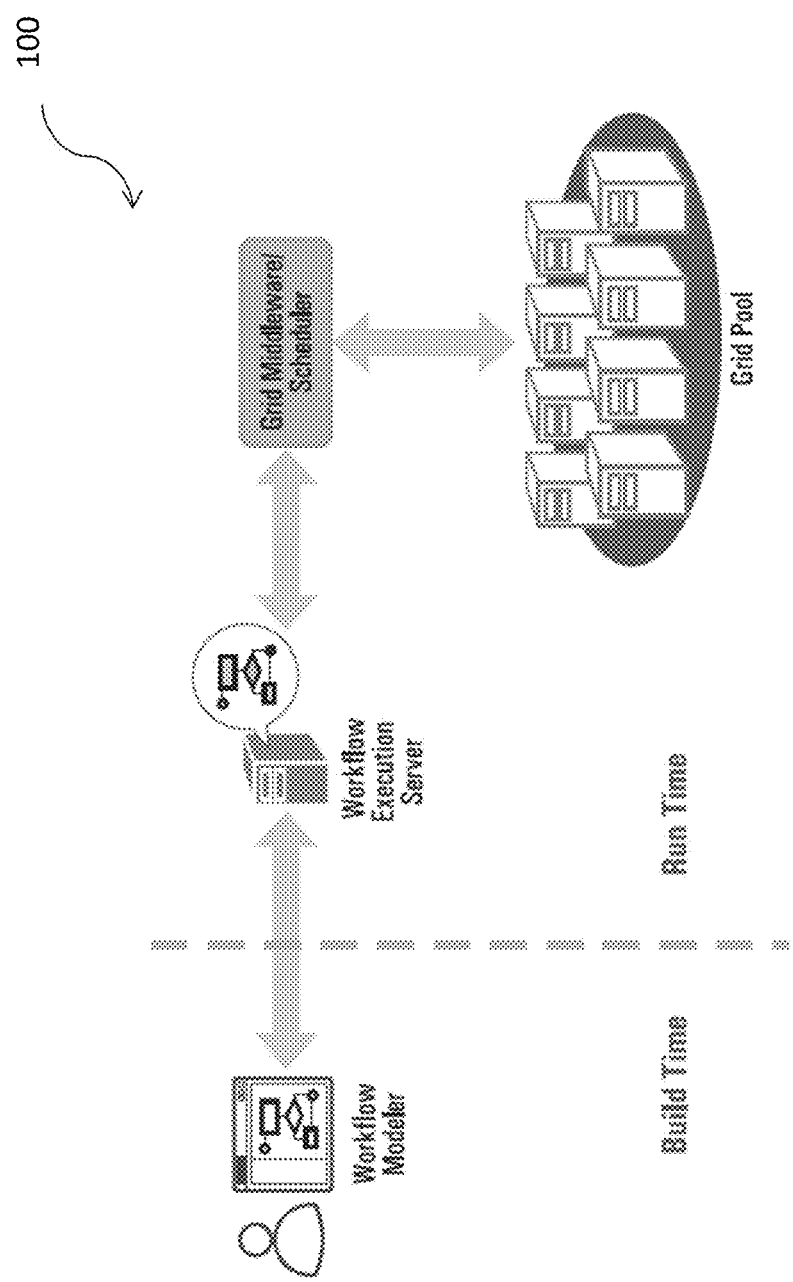
FIG. 1 is a schematic representation of a typical grid based workflow management and execution system on a non-virtualized environment, according to one or more embodiments.

Other features of the present embodiments will be apparent from the accompanying drawings and from the detailed description that follows.

DETAILED DESCRIPTION

One method of addressing the problem of developing a fault tolerant batch processing platform capable of real-time scale out may lie in implementing batch processing on a grid computing platform. Batch processing solutions based on grid computing may alleviate the limitation of proximity & homogeneity by having inherent capabilities of being highly scalable and installable in a heterogeneous environment, implement on-demand scheduling, and integrate failover detection.

Grid computing middleware are provided with the capability to detect hardware failures and may be able to migrate batch jobs to other resources. Grid middleware may also provide capabilities such as snapshots and check-pointing of an application to certain type of applications so that the application can be started elsewhere from the same state. However, migration consumes an inordinate amount of time and is dependent on the data size involved, resource availability and bandwidth. Migration may also require a fresh re-start of the application and cause the dependent application failures, data integrity issues, delay in completion etc.

Grid middleware running on a grid computing platform may be able to pick up jobs from a job-queue and schedule it in such a manner as to avoid resource contentions. However, job scheduling based on one or more business policies such as operational priority and criticality may be unavailable. In addition, compute resources may be unable to be scaled-in or scaled-up based on runtime behavior of the job by existing grid middleware.

Grid computing platforms may allow multiple jobs to run in parallel on the same resource. However, the failure of one job might hamper the performance of or even obstruct the operating system on these platforms. Such an event may cause failure in all the applications executing on the platforms and/or impact application performance. An existing grid environment may additionally be unable to guarantee system resource (memory, CPU cycles, disc etc.) availability during a job execution period despite honoring the initial request due to resource contentions.

Grid based solutions may provide failover capability that addresses the automatic rescheduling of batch-applications in case of a machine or application failover and eliminates human intervention. However they may also mandate a fresh start of the application. "Restarting" a batch-application may result in a number of unintended impacts to dependent applications, which require reset, reconfigure and, sometimes, restart as well. In addition, major data-integrity issues may be raised unless the application itself is designed to address the platform's failover criteria.

Data integrity issues may impact dependent application performance and functionality. Many batch applications are time consuming and perform complex algorithm processing on large data. Restarts might cause a time delay and thereby impact performance. Therefore, proposed herein is a solution approach based on the grid computing and virtualization technologies which provide more agility, flexibility, performance and failover to batch execution environment.

For these reasons, a solution for efficient fault-tolerant and highly resilient batch execution environment is needed to be built using a combination of distributed computing technologies such as grid computing and virtualization. A reason for choosing a combination of distributed computing technologies such as grid computing and virtualization is that a key requirement for batch execution is a highly scalable and resilient infrastructure environment for faster completion of the batch job, even if application failures occur due to software or hardware failure.

To that end, the infrastructure environment itself has to scale-in/out and scale-up/down on-demand and depending on application characteristics such as performance, infrastructural stack, computing resource growth, and other factors. For better utilization of infrastructural resources the same compute resources may be shared for multiple applications. Therefore, a sandboxed environment must be provided for each application so that each application failure is independent and self-contained in a way that ensures the performance of the application and the integrity of the environment.

Example embodiments, as described below, may be used to provide a method, an apparatus and/or a system for fault tolerant batch processing in a virtualized environment.

Such an environment may be constructed in a virtualized grid cluster. Such a cluster may itself be constructed using existing open source/commercial grid middleware including, for example, but not limited to, Condor, Sun™ grid engine, and datasynapse, and a virtualization platform including, but not limited to, Xen, VMware™, and Hyper-V. The grid cluster may be deployed on the virtualized platform wherein grid manager and nodes are deployed as virtual machines. The grid nodes may be modeled as virtual machine templates for each flavor of OS along with its related grid agent.

In one embodiment, virtual machines may be stored in a central storage environment and can be reused. These virtual machines may be quickly brought to life in any of the physical machines on-demand by the virtualization platform. These grid nodes may grow up/down during a provisioning stage, unlike a physical environment.

In one or more embodiments, a grid manager may be deployed and instantiated as virtual machine which monitors and manages all grid nodes. The grid manager may have a job-queuing system wherein all jobs submitted to clusters are lined up for scheduling. A monitoring sub-system of a grid collects information (OS, CPU, Memory, Storage etc) about each of the grid nodes. Collected information may kept in a repository so that the "match making" & "job scheduling" sub-system can map the right resource and schedule it for an execution.

A grid system may have a channeling system through which grid manager and virtual grid nodes exchange data & messages during the execution. A centralized data store associated with the grid system and the grid nodes records all data required for job execution.

In one embodiment, virtual grid nodes may be provisioned on-demand by instruction from a virtualization platform. The virtualization platform may have the ability to monitor, analyze and detect capacity demand and provision the virtual grid node based on a job profile. An approach of provisioning virtual grid nodes may be different from just deploying a grid cluster on a virtual environment. Also, the virtual grid nodes may be decommissioned as a load drops of below the configured threshold automatically.

Job Management & Workflow System

In one or more embodiments, a Graphical user interface (GUI) based system provides capabilities of job and workflow management. Classic and Virtual Machine based jobs may be defined, stored and scheduled for the execution through the GUI. The system may allow to schedule, execute, monitors and control job execution. A central repository may store relevant static and dynamic information of the job execution.

In one or more embodiments, the system provides the workflow modeling and management functionality through which jobs defined may get orchestrated as workflow and executed. A workflow engine may control the executions of jobs on a virtual grid cluster with the help of a policy engine.

In an example embodiment, a batch job may be defined using a "Job Specification Template" which may specify a general job requirement such as one or more of executable, job type, dependent files, resource specifications (CPU, Storage & Memory), OS requirement etc. To define a set of batch application jobs, the system proposes the batch job can be modeled into two types.

1. Classic Job

A classic job may generally be script based and the dependent environment is less complex in terms of configuration, and/or software requirement. Classic jobs may have the general job requirements defined and stored in the central repository. In addition, associated executable, dependent files and other relevant required information may be tagged along with the job specification. When classic jobs are scheduled, a platform identifies the right resource and injects the batch job into existing virtual grid nodes.

2. Virtual Machine Based Job

For batch jobs which require complex environments for execution may be defined and created with a set of associated virtual machines and software deployable. The platform provides a capability to define, create and store virtual machine based jobs into the central repository for reuse. The system may keep associations of dependent virtual machines so that when virtual machine based jobs are scheduled, related virtual grid nodes may be brought to life so a required complex environment can be created automatically for execution.

Queuing System

In one or more embodiments, Queuing system may hold jobs scheduled for execution in a system. A scheduler may pick up the jobs with help of a policy engine wherein policy decision making functions are carried based on overall state of an environment and business policy defined.

Virtual Grid Cluster Monitoring

In one or more embodiments, the policy engine has a policy repository, policy evaluation and scheduling engine. Virtual Grid cluster monitoring component may provide a capability of elasticity to an entire framework. A key responsibility may be to evaluate the business policies specified against each set of batch jobs by considering holistic state of underlying resource availability and other job requirements scheduled currently so that the batch jobs can be prioritized and provided with adequate resources for execution.

Policy engine may also enact actions based on events received at run time from an event manager. Based on the policy evaluation, policy engine may bring in additional new capacity to sustain the load if the current environment has inadequate capacity via a job & workflow manager.

An infrastructural manager may perform scheduling of jobs on the virtual grid cluster and also certain other on-demand requests such as commissioning and decommissioning of resources. Business policies associated with jobs, business and infrastructural policies are captured, stored and managed through the policy repository. Actions performed by the monitoring engine on an underlying infrastructure may be recorded in the central repository for audit purposes.

The policy engine may coordinate continuously with underlying grid middleware and a virtualization management system to acquire run time information about one of infrastructural resource capacity, availability, state via the event message bus. The run time information is stored into the central repository. Policy evaluation engine may use the run time information in its evaluation phase to prioritize & schedule jobs.

Storage System

A central shared storage system relies on existing network shared storage file system technologies such SAN, and/or NAS. Policy repository, infrastructure state repository, job specification & template, virtual grid node templates & configuration may be partitioned and persisted in the central shared storage system. Also, a script, executable, dependent files, job output & errors may be persisted in the central shared storage system. In one or more embodiments, a batch application relies on external applications and corresponding data store, in this case key and minimal relevant information may persisted in the central shared storage system.

Figure 3:
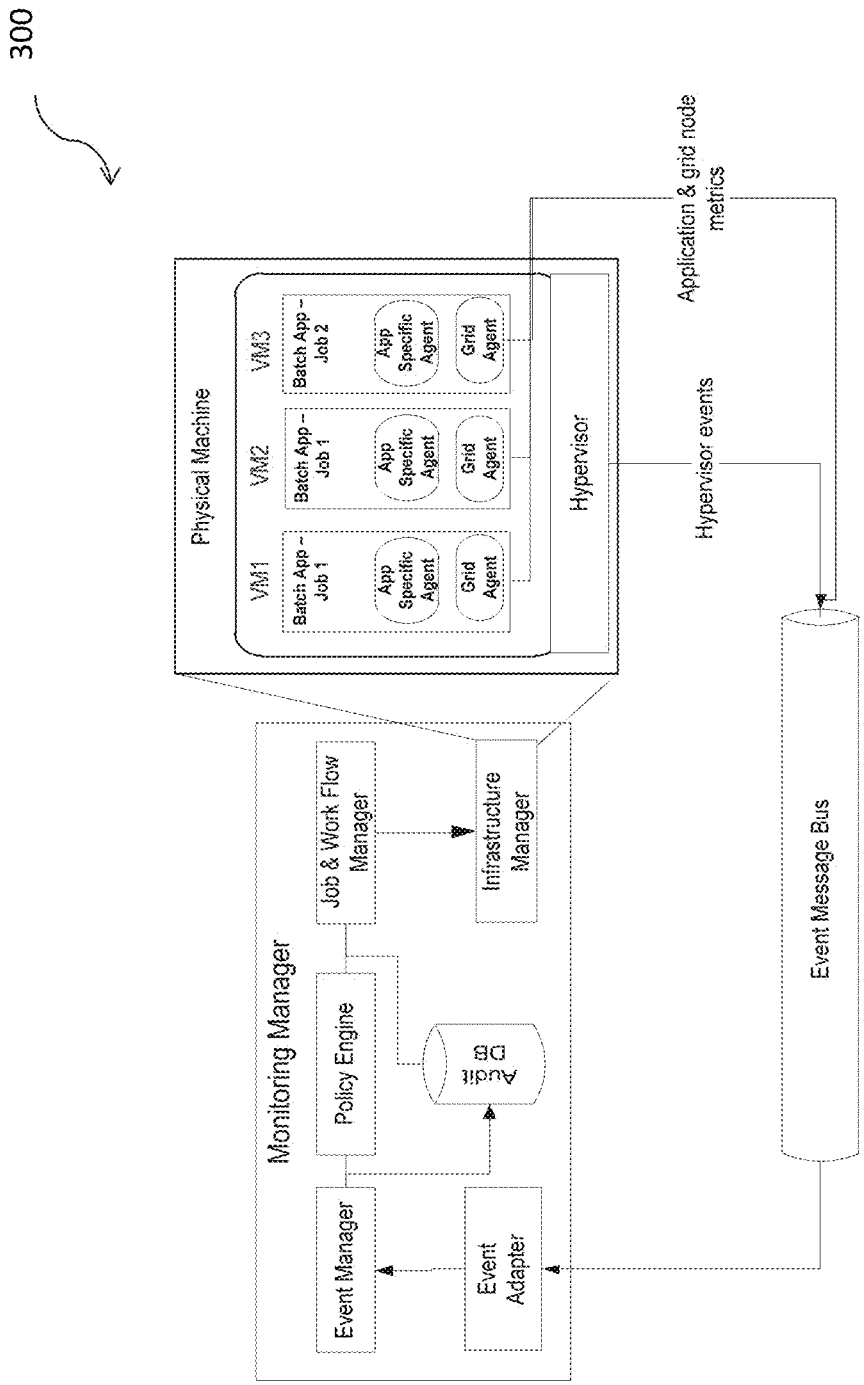
FIG. 3 illustrates a virtual grid cluster monitoring engine, according to one or more embodiments.

In one or more embodiments, FIG. 3 describes an end-to-end flow of running a batch application through a virtualized infrastructure by using a virtualized platform. An overall architecture and batch process implemented may use a batch application platform 300 as shown in FIG. 3.

Every component shown in FIG. 3 may be under control of the batch application platform 300, datacenter infrastructure components, job & workflow manager, policy engine, and a virtual grid Manager. Batch applications may be stored in a central repository. Batch jobs may be submitted to an inbound queue by a batch admin. The inbound queue contains the input script needed to run the batch application, the Job and workflow manager may execute the input script as a job through the virtual grid manager. The virtual grid manager may handle commissioning and decommissioning of batch applications based on the grid pool resource availability.

Figure 2:
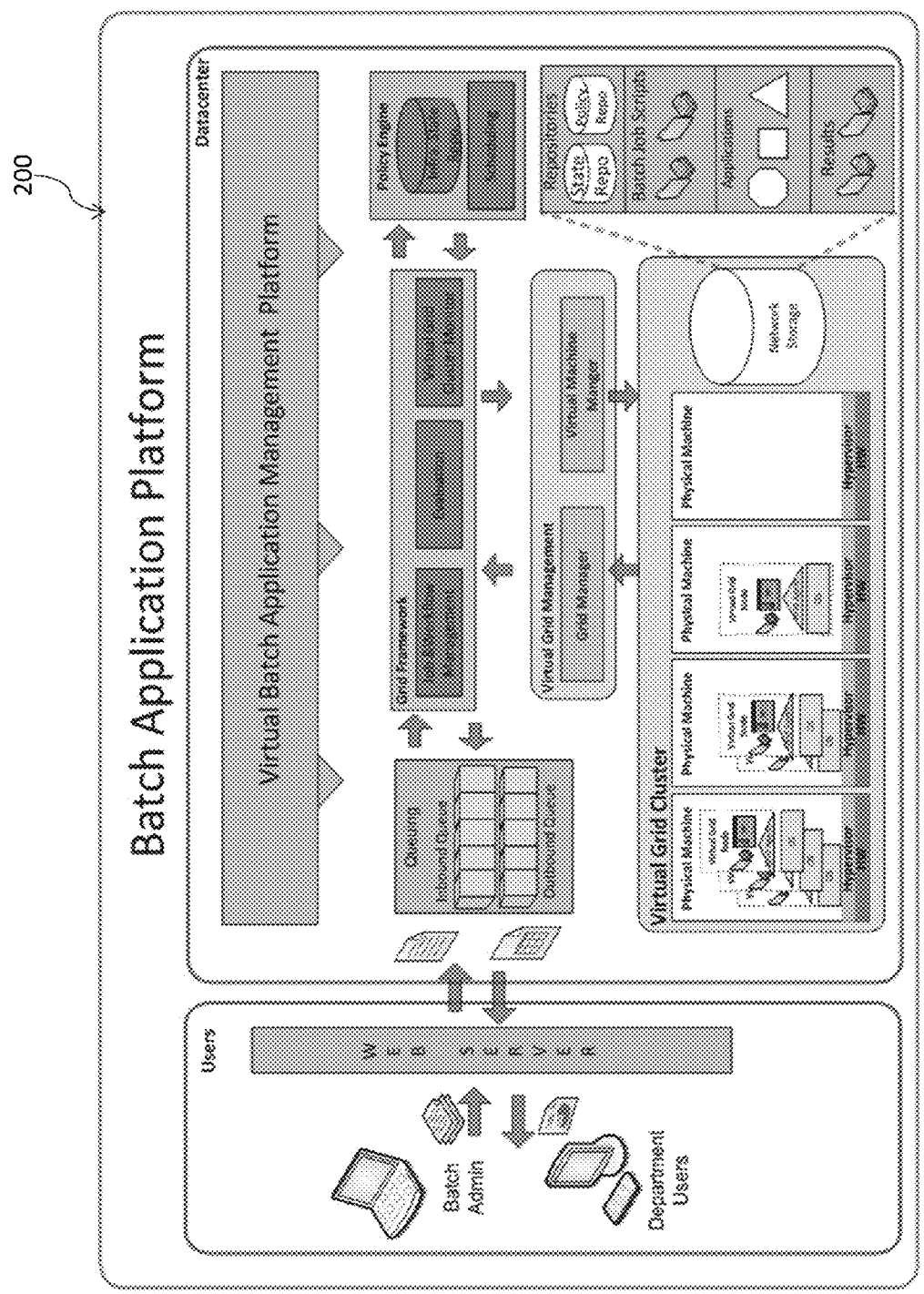
FIG. 2 illustrates a virtual batch application management platform, according to one or more embodiments.

In an example embodiment, a single resource is not dedicated to the one single batch job. Resources may be shared among few jobs depending on a job environment needed by the jobs. A Grid Manager finally also performs any post-processing operations required specific for the given batch job. Results such as Errors and/or Reports may be submitted to an outbound queue for consumption. Although FIG. 2 shows inbound and outbound queues as external to the batch application platform, the inbound and outbound queues may be run under control of the batch application platform as well.

In an example embodiment, end-to-end setting up and running a batch application in a virtualized environment is managed through a batch application platform through a set of API. Prior to creating a batch environment, the inbound and outbound queues may be created. Inbound and outbound queues may be created through the batch application platform through using a predefined macro to assist in various system configuration tasks. By running the predefined macro within a management dashboard, inbound and outbound queues will be created automatically.

In one embodiment, batch jobs may be submitted by the batch admin. Depending on the requirements of the batch jobs, the batch jobs run on a single or set of applications which may need to be deployed and configured on demand by the job and workflow management engine.

In one embodiment, a first role of the batch admin may be to create a set of batch script file(s) required by the batch job. A Work unit structure may be constructed with details about the batch script file(s) and the batch job to be performed. Further, the batch script file(s) may uploaded to a central storage repository and a batch job data may be created for an inbound queue which encompasses an application environment in addition to details on the batch script file. Finally, a batch job message may be pushed in the inbound Queue.

Repeat for every batch job that is to be run on the application in the virtual grid environment. In one or more embodiments, the batch application platform may set up an environment and execute the batch job in a virtualized environment using the job and workflow manager. The batch application platform may integrate with any third party Grid manager which exposes their interfaces as services. The batch application platform integrates with the exposed services to utilize the services of the gird manager. The batch application platform may run single and/or multiple batch jobs in parallel.

The batch application platform may contain a schedule whose function is to monitor the inbound queue, and to launch the job and workflow manager instance to process the batch job from the inbound queue. Different scaling metrics may be used to determine a number of manager instances that may be launched and when to launch the instances, with the most common metric being a number of jobs in the inbound queue. Within a management dashboard, the batch admin may specify that for every 'N' jobs in the inbound queue, a manager instance should be launched.

In one or more embodiments, a scheduler may launch the job and workflow manager instance as required, a call may be made within the batch application platform to initiate an allocation of server resources for running the batch jobs. Setup manager may setup required applications in the virtualized environment. Setup manager may execute application installation scripts as defined by an application environment.

Prior to launching an application, a server template for the setup manager may be created indicating application specific details, such as size of the instance, base operating system, hardware environment details in which a virtual instance is to be launched, along with other configuration information.

The server template can be created manually and/or automatically by calling the macro. Another key aspect of batch application platform is the server template. The server template may be specified with a technology stack required on the virtual instance and performs installation of tools as well as the installation of application code. The required application code may be downloaded from a secure file share repository, and installed on the virtual instance as specified in an application installation script run at the end of the instance's boot cycle.

In an example embodiment, Once the application is ready, configuration scripts may be run to build a required architecture. Batch scripts may be moved to an appropriate location so that a batch application can identify scripts and run them. The job and workflow manager may trigger the scripts on the virtual application instance to perform required operations.

In one or more embodiments, a Grid monitoring and evaluation engine may check a health of the batch application and continuously feeds the batch job data to the batch application platform to check if any policies are violated. A Policy engine may evaluate the policies specified against each of the batch jobs by considering a holistic state of an underlying resource availability and other jobs scheduled currently so that all the batch jobs may have adequate resources for execution.

The grid monitoring and evaluation engine may also provide a capability of elasticity to the entire framework. If any deviation is noted in the behavior of the batch jobs the grid monitoring and evaluation engine dynamically changes the health of the batch application by increasing or decreasing the underlying infrastructure.

In one or more embodiments, once the batch application performs a required operation and a required output result may be obtained, the job and workflow manager may uploads output files and/or error(s) to a central repository to be processed by the batch admin.

In an example embodiment, a primary objective of virtualization of batch application may be to increase a throughput of the processing and to completely utilize the underlying infrastructure resources. Utilizing the underlying infrastructure may refer to processing as much data as possible in as less time as possible.

In one or more embodiments, virtualization grid processing of batch jobs may meet various challenges compared to the traditional grid processing as below.

Virtualization technologies inherent capabilities such as live migration, DRS, application isolation and resource guarantees may not be available in non-virtualized solution(s). Virtualization solution(s) may be exploited to make the batch application platform agile, flexible and highly scalable.

In an example embodiment, during job failure data, state information and an associated executable may to be moved to different resource. A size of job failure data, state information and an associated executable information may be dependent on a data set on which batch job may be performing an operation and/or execution process state. By deploying an efficient shared central storage system like SAN and/or NAS jobs modeled using virtual machines may be easily brought to life in another machine with a very limited delay. Easy transformation may be possible because the virtual machines are exist the same central storage system. A live migration capability allows system state transferable to another machine with an efficient algorithm built-in to virtualization framework.

In an example embodiment, an optimal chunk size of the Batch application may be determined so that underlying infrastructure may be maximally utilized and multiple discrete applications can be processed in a single server.

In an example embodiment, handling critical batch application may be possible with predictability using snapshot and dynamic resource migration of a virtual machine if any failure arises.

In an example embodiment, priority jobs may be handled on limited infrastructural resources by snapshot of current jobs on the virtual grid and giving way to priority jobs.

In an example embodiment, failure handling of compute resources may be very important as failure may cause degradation of the throughput performance. Early detection of failures and seamless migration to compatible resources without restarting the whole process from start might become a necessity. Multiple probes may be built along with the batch application to monitor the health of virtualized instances to ensure reliability of the batch application platform.

In an example embodiment, running multiple batch applications in a single platform may help reduce an overall cost, not only to host and run the multiple batch applications but also to use built in virtual instances which may help projects/products reduce overheads in setting up grid facility. Virtualized grid infrastructure along with virtual batch application platform may benefit in terms of reduced time, effort and cost involved in setting up various batch jobs.

In an example embodiment, a policy engine plays a vital role in scheduling batch jobs in virtual environment based on priority, criticality and availably. Scale-in & up of resources for a job can be easily achieved by utilizing virtualization. Application isolation may be an important requirement through which jobs can be guaranteed with resources committed for entire execution life span. Also, application isolation may alleviate application failover impact to others completely. Hence, in a highly parallel multi-tenant distributed environment, application isolation may play a vital role for application performance.

In an example embodiment, a virtual batch application management platform may offer enterprises a full service catalog to run a range of production jobs through high loads. The virtual batch application management platform's ready-made solutions shrink batch cycles, on-demand provisioning aligns costs with use, configurable simulation tools simplify the deployment process, and early stage analysis of weak links and risks ensure business continuity and return on investments.

In an example embodiment, a typical grid based workflow management and execution system on a non-virtualized environment is depicted in FIG. 1.

In one or more embodiments, FIG. 3 illustrates Virtual Grid Cluster Monitoring Engine 300.

In one or more embodiments, FIG. 2 illustrates a virtual batch application management platform 200.

Figure 4:
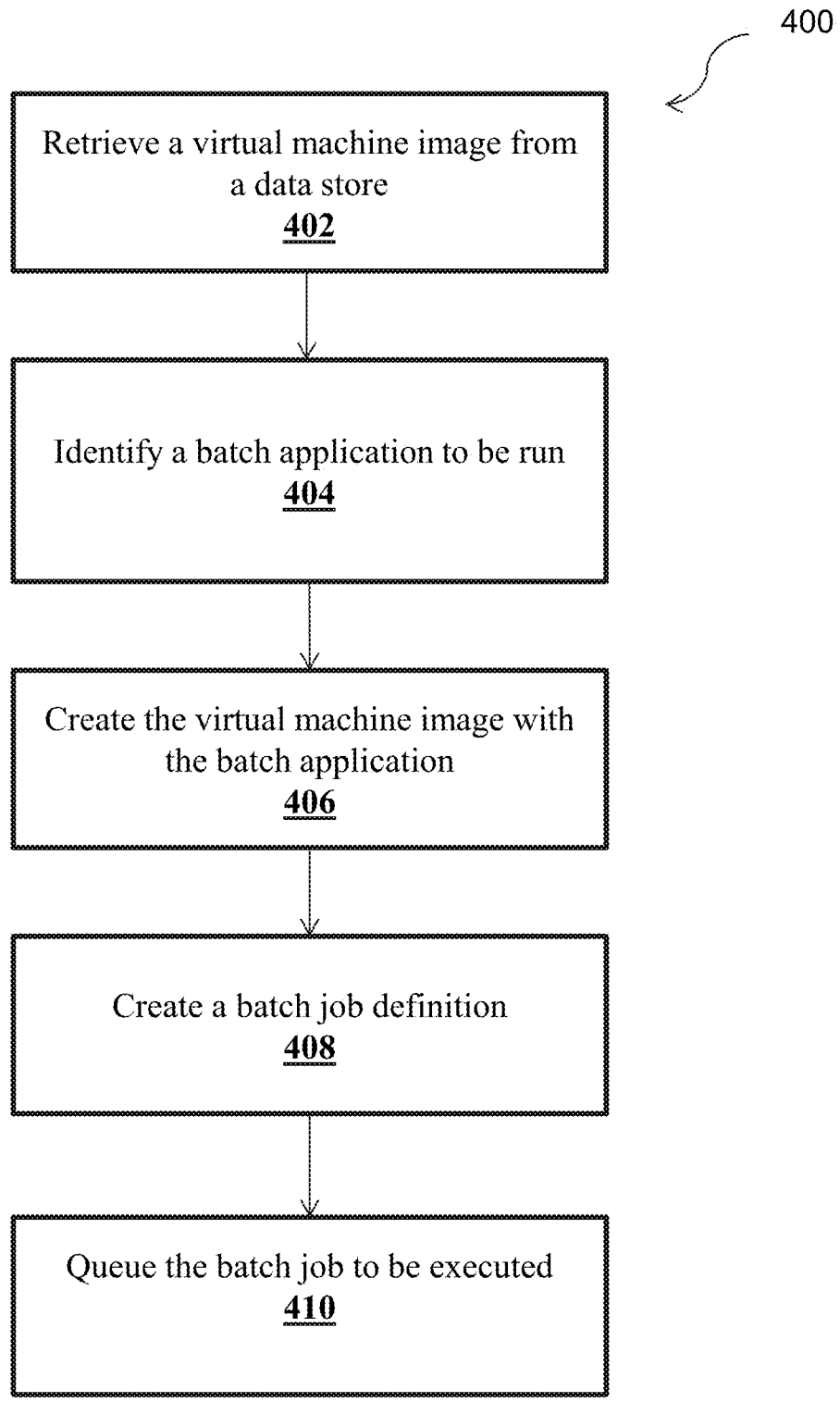
FIG. 4 is an illustrative process flow diagram of a method for a computing device in a grid cluster that queues a batch job to be executed, according to one or more embodiments.

In one more embodiments, FIG. 4 illustrates a method implemented by a computing device in a grid cluster 400, the method including steps of retrieving a virtual machine image from a data store 402, identifying a batch application to be run 404, creating the virtual machine image with the batch application 406, creating a batch job definition 408, and queuing the batch job to be executed 410.

Figure 5:
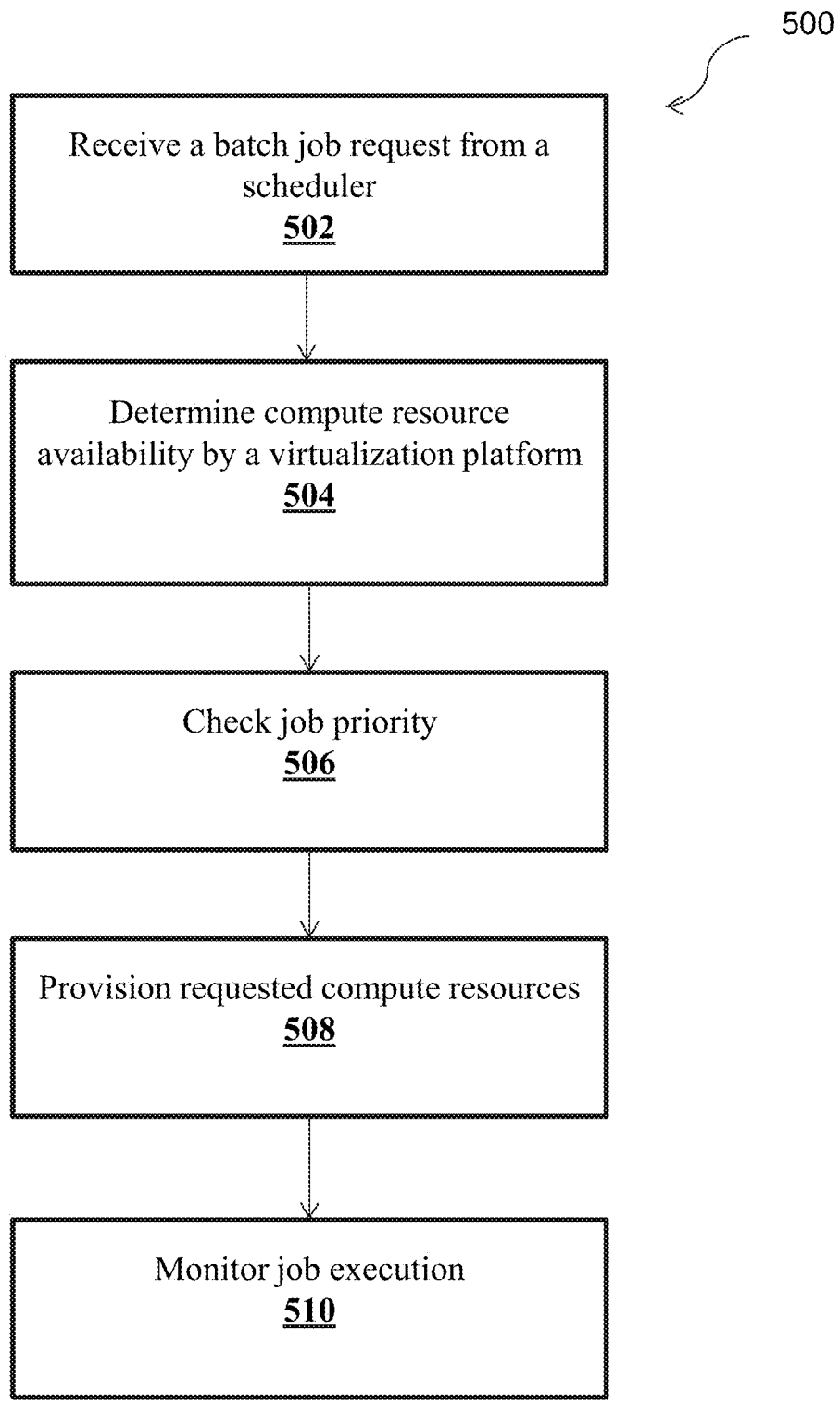
FIG. 5 is an illustrative process flow diagram of a method for a computing device in a grid cluster that monitors job execution, according to one or more embodiments.

In one more embodiments, FIG. 5 illustrates a method implemented by at least one computing device in a grid cluster 500 including the steps of receiving a batch job request from a scheduler 502, determining compute resource availability by a virtualization platform 504, checking job priority 506, provisioning requested compute resources 508, and monitoring job execution 510.

In one or more embodiments, a system may be configured to perform batch job execution in a virtualized environment, the system comprising: one or more computing devices configured as a virtualized grid cluster by means of a virtualization platform, the cluster comprising: a centralized storage repository associated with computer memory across one or more of the computing devices, a grid manager deployed on an instantiated virtual machine and configured to: manage one or more incoming job requests. The managing may comprises deploying a job and workflow management instance for defining and storing an incoming job request at the centralized storage repository.

Further, the grid manager may queue one or more of the received job requests in a job execution queue wherein the position of a job request in the queue is determined by a policy engine associated with the grid manager. Also, the grid manager may monitor one or more virtual grid nodes. A virtual grid node may be provisioned on demand by the virtualization platform, and monitoring may comprise collecting computing resource utilization by the virtual grid node and deploying tasks to one or more of the grid nodes.

Further, the system may include a message bus whereby data and messages may be exchanged between the grid manager and one or more grid nodes.

Still further, the policy engine may include a policy repository. The policy repository may storage of one or more user defined policies. Also, the policy engine may include a policy evaluation engine, whereby a job is evaluated against one or more of the policies retrieved from the policy repository and a scheduling engine, whereby one or more jobs are scheduled in the job execution queue.

The policy engine may modify the placement of a job in the queue on the basis of an assigned priority derived from comparison of the job with the one or more policies in the policy repository by the policy evaluation engine.

User defined policies in the policy repository may include at least one of a business policy and an operational policy.

The grid manager may be configured to provision compute resources on the virtual cluster for job execution by means of the virtualization platform. The quantum of resources commissioned may specified by the grid manager.

The grid manager may be configured to provision compute resources on the virtual cluster for job execution by means of the virtualization platform. The quantum of resources commissioned may be specified by the job request.

The compute resources provisioned may constitute one or more virtual grid nodes.

The policy engine may be configured to receive run time information on compute resource capacity, availability and state relating to the one or more grid nodes via the message bus.

Computing resource related information and job execution information may be stored in the policy repository.

The grid manager may be configured to place a job in an inbound job execution queue or an outbound job queue.

The grid manager may be configured to deploy a job monitoring instance for each of the jobs in the inbound job execution queue.

A management dashboard user interface may include information relating to job performance which is displayed through the user interface represented on a display means.

The policy repository may comprise of at least one policy specific to one or more software applications deployed on the virtual grid cluster. An incoming job request may conform to a predefined job specification template, the job specification template specifying one or more job requirements including at least one of a job type, operating system, and compute resource requirements comprising one or more CPU cycles, storage requirements and computer memory usage requirements.

In one or more embodiments, a method implemented by one or more computing devices in a grid cluster, the method may comprise receiving, by the one or more computing devices comprising a processor and a processor readable memory, an input job request, processing the input job request by a grid manager process running on the one or more computing devices, wherein processing comprises: checking for computing resource availability and job priority, provisioning, by the one or more computing devices, computing resources for completion of the job request by a grid manager process, and monitoring, by a monitoring engine process running on the one or more computing devices, the computing resource usage profile of the job during execution.

The method may further comprise stopping one or more low priority jobs currently executing if a high priority job request is received by the grid manager process. The method may further comprise placing the received job request in a job queue based on the job priority associated with the job request. The job request may be retrieved from a job queue on shared storage in the grid cluster.

The method may further comprise retrieving a virtual machine image from a data store associated with the one or more computing devices, identifying a batch application to be run on the one or more computing devices, creating a virtual machine image on one or more computing devices in the grid cluster and creating a batch job definition by the grid manager process with an allocation of a predetermined compute resource capacity.

The method may further comprise modifying the position of a job request in the job queue by a policy engine process. The policy engine may modify the placement of a job in the queue on the basis of an assigned priority derived from comparison of the job with the one or more policies in a policy repository.

The policy engine may be configured to receive run time information on compute resource capacity, availability and state relating to the one or more computing devices in the grid cluster.

A received job request may conform to a predefined job specification template, the job specification template specifying one or more job requirements including at least one of a job type, operating system, and compute resource requirements comprising one or more CPU cycles, storage requirements and computer memory usage requirements.

Although the present embodiments have been described with reference to specific example embodiments, it will be evident that various modifications and changes may be made to these embodiments without departing from the broader spirit and scope of the various embodiments.

Embodiments of the invention may be implemented on a data processing system capable of processing a set of instructions to perform any one or more of the methodologies herein. In various embodiments, the data processing machine operates as a standalone device and/or may be connected (e.g., networked) to other machines.

In a networked deployment, the machine may operate in the capacity of a server and/or a client machine in server-client network environment, or as a peer machine in a peer-to-peer (or distributed) network environment. The machine may be a personal-computer (PC), a tablet PC, a Personal Digital Assistant (PDA), a cellular telephone, a web appliance, a network router, switch or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example data processing machine may include a processor (e.g., a central processing unit (CPU) a graphics processing unit (GPU) and/or both), a main memory and a static memory, which communicate with each other via a bus. The computer system may further include a video display unit (e.g., a liquid crystal displays (LCD) and/or a cathode ray tube (CRT)). The computer system also includes an alphanumeric input device (e.g., a keyboard), a cursor control device (e.g., a mouse), a disk drive unit, a signal generation device (e.g., a speaker) and a network interface device.

The disk drive unit includes a machine-readable medium on which is stored one or more sets of instructions (e.g., software) embodying any one or more of the methodologies and/or functions described herein. The instructions may also reside, completely and/or at least partially, within the main memory and/or within the processor during execution thereof by the computer system, the main memory and the processor also constituting machine-readable media.

The instructions may further be transmitted and/or received over a network via the network interface device. While the machine-readable medium in an example embodiment may be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware, firmware and software (e.g., embodied in a machine readable medium). For example, the various electrical structure and methods may be embodied using transistors, logic gates, and electrical circuits (e.g., application specific integrated (ASIC) circuitry and/or in digital signal processor (DSP) circuitry).

In addition, it will be appreciated that the various operations, processes, and methods disclosed herein may be embodied in a machine-readable medium and/or a machine accessible medium compatible with a data processing system (e.g., a computer devices), may be performed in any order (e.g., including using means for achieving the various operations). Accordingly, the specification and drawings are to be regarded in an illustrative rather than a restrictive sense.

What is claimed is:

1. A method executed by one or more computing devices for batch processing in a virtual environment the method comprising:
   identifying by at least one of the one or more computing devices, a batch job for execution, the batch job including a specification template specifying the required execution environment for the batch job and a batch application;
   determining, by at least one of the one or more computing devices, one or more virtual machine images based at least in part on the required execution environment;
   creating, by at least one of the one or more computing devices, one or more batch job-specific virtual machine images based at least in part on the one or more virtual machine images and the batch application; and
   generating, by at least one of the one or more computing devices, a batch job definition corresponding to the batch job, the batch job definition including an allocation of predetermined computing resources required for completion of the batch job; and
   queueing, by at least one of the one or more computing devices, the batch job for execution on a job queue.

2. The method as claimed in claim 1, further comprising:
   receiving, by at least one of the one or more computing devices, the batch job from the job queue;
   determining, by at least one of the one or more computing devices, whether sufficient computing resources are available for execution of the batch job based at least in part on the allocation of predetermined computing resources in the batch job definition;
   provisioning, by at least one of the one or more computing devices, one or more batch job-specific virtual machines from the one or more batch job-specific virtual machine images based at least in part on a determination that sufficient computing resources are available; and
   monitoring, by at least one of the one or more computing devices, execution of the batch job on the one or more batch job-specific virtual machines.

3. The method as claimed in claim 1, wherein the batch job is queued in the job queue based on a job priority associated with the batch job.

4. The method as claimed in claim 1, wherein determining one or more virtual machine images based at least in part on the required execution environment comprises:
retrieving the one or more virtual machine images from a data store based at least in part on the required execution environment.

5. The method as claimed in claim 1, wherein determining one or more virtual machine images based at least in part on the required execution environment comprises:
creating the one or more virtual machine images based at least in part on the required execution environment.

6. The method as claimed in claim 1, further comprising:
modifying, by at least one of the one or more computing devices, the position of the batch job in the job queue based at least in part on an assigned priority derived from comparison of the batch job with one or more policies in a policy repository.

7. The method of claim 1, wherein the batch job comprises a high priority batch job and further comprising:
determining, by at least one of the one or more computing devices, whether sufficient computing resources are available for execution of the batch job based at least in part on the allocation of predetermined computing resources in the batch job definition; and
stop, by at least one of the one or more computing devices, one or more low priority batch jobs based at least in part on a determination that sufficient computing resources are not available for execution of the batch job.

8. A system for batch processing in a virtual environment, the system comprising:
one or more processors; and
one or more memories operatively coupled to at least one of the one or more processors and having instructions stored thereon that, when executed by at least one of the one or more processors, cause at least one of the one or more processors to:
identify a batch job for execution, the batch job including a specification template specifying the required execution environment for the batch job and a batch application;
determine one or more virtual machine images based at least in part on the required execution environment;
create one or more batch job-specific virtual machine images based at least in part on the one or more virtual machine images and the batch application; and
generate a batch job definition corresponding to the batch job, the batch job definition including an allocation of predetermined computing resources required for completion of the batch job; and
queue the batch job for execution on a job queue.

9. The system of claim 8, wherein at least one of the one or more memories has further instructions stored thereon that, when executed by at least one of the one or more processors, cause at least one of the one or more processors to:
receive the batch job from the job queue;
determine whether sufficient computing resources are available for execution of the batch job based at least in part on the allocation of predetermined computing resources in the batch job definition;
provision one or more batch job-specific virtual machines from the one or more batch job-specific virtual machine images based at least in part on a determination that sufficient computing resources are available; and
monitoring, by at least one of the one or more computing devices, execution of the batch job on the one or more batch job-specific virtual machines.

10. The system of claim 8, wherein the batch job is queued in the job queue based on a job priority associated with the batch job.

11. The system of claim 8, wherein the instructions that, when executed by at least one of the one or more processors, cause at least one of the one or more processors to determine one or more virtual machine images based at least in part on the required execution environment further cause at least one of the one or more processors to:
retrieve the one or more virtual machine images from a data store based at least in part on the required execution environment.

12. The system of claim 8, wherein the instructions that, when executed by at least one of the one or more processors, cause at least one of the one or more processors to determine one or more virtual machine images based at least in part on the required execution environment further cause at least one of the one or more processors to:
create the one or more virtual machine images based at least in part on the required execution environment.

13. The system of claim 8, wherein at least one of the one or more memories has further instructions stored thereon that, when executed by at least one of the one or more processors, cause at least one of the one or more processors to:
modify the position of the batch job in the job queue based at least in part on an assigned priority derived from comparison of the batch job with one or more policies in a policy repository.

14. The system of claim 8, wherein the batch job comprises a high priority batch job and wherein at least one of the one or more memories has further instructions stored thereon that, when executed by at least one of the one or more processors, cause at least one of the one or more processors to:
determine whether sufficient computing resources are available for execution of the batch job based at least in part on the allocation of predetermined computing resources in the batch job definition; and
stop execution of one or more low priority batch jobs based at least in part on a determination that sufficient computing resources are not available for execution of the batch job.

15. At least one non-transitory computer-readable medium storing computer-readable instructions that, when executed by one or more computing devices, cause at least one of the one or more computing devices to:
identify a batch job for execution, the batch job including a specification template specifying the required execution environment for the batch job and a batch application;
determine one or more virtual machine images based at least in part on the required execution environment;
create one or more batch job-specific virtual machine images based at least in part on the one or more virtual machine images and the batch application; and
generate a batch job definition corresponding to the batch job, the batch job definition including an allocation of predetermined computing resources required for completion of the batch job; and
queue the batch job for execution on a job queue.

16. The at least one non-transitory computer-readable medium of claim 15, further storing computer-readable instructions that, when executed by at least one of the one or more computing devices, cause at least one of the one or more computing devices to:
- receive the batch job from the job queue;
- determine whether sufficient computing resources are available for execution of the batch job based at least in part on the allocation of predetermined computing resources in the batch job definition;
- provision one or more batch job-specific virtual machines from the one or more batch job-specific virtual machine images based at least in part on a determination that sufficient computing resources are available; and
- monitoring, by at least one of the one or more computing devices, execution of the batch job on the one or more batch job-specific virtual machines.

17. The at least one non-transitory computer-readable medium of claim 15, wherein the batch job is queued in the job queue based on a job priority associated with the batch job.

18. The at least one non-transitory computer-readable medium of claim 15, wherein the instructions that, when executed by at least one of the one or more computing devices, cause at least one of the one or more computing devices to determine one or more virtual machine images based at least in part on the required execution environment further cause at least one of the one or more computing devices to:
- retrieve the one or more virtual machine images from a data store based at least in part on the required execution environment.

19. The at least one non-transitory computer-readable medium of claim 15, wherein the instructions that, when executed by at least one of the one or more computing devices, cause at least one of the one or more computing devices to determine one or more virtual machine images based at least in part on the required execution environment further cause at least one of the one or more computing devices to:
- create the one or more virtual machine images based at least in part on the required execution environment.

20. The at least one non-transitory computer-readable medium of claim 15, further storing computer-readable instructions that, when executed by at least one of the one or more computing devices, cause at least one of the one or more computing devices to:
- modify the position of the batch job in the job queue based at least in part on an assigned priority derived from comparison of the batch job with one or more policies in a policy repository.

21. The at least one non-transitory computer-readable medium of claim 15, wherein the batch job comprises a high priority batch job and further storing computer-readable instructions that, when executed by at least one of the one or more computing devices, cause at least one of the one or more computing devices to:
- determine whether sufficient computing resources are available for execution of the batch job based at least in part on the allocation of predetermined computing resources in the batch job definition; and
- stop execution of one or more low priority batch jobs based at least in part on a determination that sufficient computing resources are not available for execution of the batch job.

* * * * *